United States Patent [19]
Liberty

[11] Patent Number: 6,026,641
[45] Date of Patent: Feb. 22, 2000

[54] METHOD AND APPARATUS FOR IMPROVED CONTROL OF EXHAUST GAS TEMPERATURE FROM A TWO-STROKE ENGINE

[76] Inventor: Ross H. Liberty, 3001 Boonville Rd., Ukiah, Calif. 95482

[21] Appl. No.: 09/017,454

[22] Filed: Feb. 2, 1998

[51] Int. Cl.[7] ..................................................... F02B 27/02
[52] U.S. Cl. ................................ 60/314; 60/312; 60/274; 210/446
[58] Field of Search .............................. 60/273, 310, 312, 60/314, 282, 274; 210/446

[56] References Cited

U.S. PATENT DOCUMENTS

| | | | |
|---|---|---|---|
| 3,630,030 | 12/1971 | Wagner | 60/274 |
| 4,920,745 | 5/1990 | Gilbert | 60/273 |
| 5,121,602 | 6/1992 | McCorvey | 60/310 |
| 5,746,054 | 5/1998 | Matte | 60/310 |

Primary Examiner—Thomas Denion
Assistant Examiner—Binh Tran
Attorney, Agent, or Firm—Townsend and Townsend and Crew LLP

[57] ABSTRACT

An exhaust gas temperature control system for a two-stroke engine, the exhaust gas temperature control system including an electronically controlled water injection system. The electronically controlled water injection system includes a water supply conduit section for supplying water to a solenoid valve, and a spraying conduit section for injecting water into an exhaust pipe to thereby control exhaust gas temperature, and hence sonic wave speed within the exhaust pipe. A through-filter is provided as a splitting junction to provide filtered water to the electronically controlled water injection system and unfiltered water to the engine for cooling. A smoothing device in the form of an elastomer hose made of low durometer material or a pressurized bladder is included within the spraying conduit section for maintaining smooth water pressure within the water injected into the exhaust pipe. Additionally, a capturing device in the form of a pressurized bladder and check valve is provided within the supply conduit section in order to maintain ample water pressure supplied to the solenoid valve.

5 Claims, 4 Drawing Sheets

METHOD AND APPARATUS FOR IMPROVED CONTROL OF EXHAUST GAS TEMPERATURE FROM A TWO-STROKE ENGINE

BACKGROUND OF THE INVENTION

1. Technical Field of the Invention

This invention relates to an exhaust gas temperature control system and, more particularly, to a method and apparatus for improved exhaust gas temperature control within an exhaust system of a two-stroke engine in order to improve engine performance.

2. Description of the Prior Art

Small two-stroke engines, or two-cycle engines, as they are also sometimes referred to, are commonly found in motorcycles, personal watercraft, such as JET SKIs, snowmobiles, and the like. Two-stroke engines are desirable for these types of vehicles in that they provide high output, have a low weight contained within small packaging, and are economical to produce.

Basic operation of a two-stroke engine requires two piston strokes or only one revolution for each cycle. Exhaust ports in the cylinder wall are uncovered by the piston, or exhaust valves in the cylinder head are open near the end (at 60%–88%) of the expansion stroke, permitting the escape of exhaust gases and reducing the pressure in the cylinder. A charge of air or combustible mixture flows into and is compressed in a separate crankcase compartment for each cylinder to slightly above atmospheric pressure. Intake ports are uncovered by the piston or intake valves and are opened soon after the opening of the exhaust, and the compressed charge flows into the cylinder, expelling most of the exhaust products, some unburned charge escaping with the exhaust. Just before the piston reaches top dead center, the unburned charge within the cylinder ignites, which in turn drives the piston downward. As the piston moves down, the exhaust port in the cylinder wall is exposed. The hot exhaust gas is released into the exhaust system via this exhaust port. However, also released at this time is a high pressure pulse. This pressure pulse is a sonic wave that travels at the speed of sound independently of the exhaust gas itself. The exhaust system has an expanding and diverging shape to its initial section, and the sonic wave travels the length of this initial section until it reaches a second section of the exhaust system which has a converging shape. Once the sonic wave reaches this converging section, it is reflected back toward the exhaust port. During this time the piston has traveled downwardly, thereby exposing the transfer ports that allow incoming fresh charge to replace the outgoing burned charge. A well-tuned exhaust system will draw out all of the burned charge and, as previously mentioned, a bit of the fresh unburned charge into the exhaust system. Such a well-tuned exhaust system will utilize the aforementioned pressure pulse that is being returned by the converging section to push this fresh charge back into the cylinder. This results in higher-power output, lower emissions, and better fuel economy. As can be readily discerned, timing is critical since if the pressure pulse is returned too late or too early, the benefit of the tuned exhaust system is at best diminished, and at worst the exhaust system is a detriment. Given that the engine rpm varies, it is easy to see the value in varying the time required for the pressure wave to return. This may be accomplished by changing the distance the wave must travel or by changing the speed at which it travels. Electronically controlled water injection (ECWI) deals with changing the speed at which the pressure pulse travels.

ECWI is a system developed by applicant that monitors engine rpm and injects water into the exhaust system in order to control exhaust gas temperature (EGT), which in turn affects sonic wave speed. Briefly, ECWI opens a solenoid valve at low engine speed that injects fluid, such as water, into the exhaust system, causing EGT to fall. Conversely, as engine rpms rise, the solenoid valve closes to thereby allow EGT to rise. The result of this process is an increase in low rpm power without affecting top speed, while the downside is that such an "on/off" approach leaves a large rpm range where the slow sonic wave speed is too slow and the fast sonic wave speed is too fast. Ideally, a "gradual" approach to controlling EGT is desired.

Several ways of accomplishing such a gradual approach to controlling EGT have been attempted. Examples include electronic servo valves, mechanical valves with shifting spools, multiple solenoid valves in different locations or with varying spray nozzle sizes, and dedicated variable speed pumps. One of the better approaches involves utilizing a single solenoid valve and varying the amount of water it sprays into the exhaust system with pulsed width modulation, i.e. opening and closing the valve at high speeds (a frequency of about 50 Hz) and varying the percentage of "on" versus "off" time. This allows one to discretely vary water injected into the exhaust system with an inexpensive solenoid valve and to create a water injection modulation map that will provide the right amount of water for each rpm to thereby create a smooth power curve without the low power points on the curve. However, a major drawback with pulse width modulation lies in the fact that it tends to overcompensate in that the EGT (hence, the sonic wave speed) changes so quickly that in the time span of one pulse cycle, the EGT will go from too high (fast) to too low (slow) and back again. This compromises performance.

Finally, ECWI requires solenoid valves and spray nozzles with small orifices in order to operate correctly. This, of course, necessitates the use of a filter or filters. In the case of personal watercraft, filters are of particular importance since water directly from the lake is used for engine and exhaust system cooling. However, the engine cooling water requires no filtering since there are no small orifices to plug with debris from the lake. Thus, only the water supplied to the solenoid valves and spray nozzles needs to be filtered. Such filters, however, also need to be kept clean so that the supply of water to the ECWI system is not disrupted.

Accordingly, apparatus and a process are needed that control the exhaust gas temperature, and thereby the sonic wave speed, in a smooth and consistent manner.

SUMMARY OF THE INVENTION

A two-stroke engine in accordance with the present invention, and operation of such an engine, addresses the shortcomings of the prior art.

In accordance with one aspect of the present invention, an exhaust gas temperature control system is provided for use with a two-stroke engine having an engine exhaust system, the control system comprising a fluid inlet for providing fluid to control the exhaust gas temperature within the engine exhaust system, a first fluid supply in fluid communication with the fluid inlet, a second fluid supply in fluid communication with the engine exhaust system, a valve connecting the first fluid supply and the second fluid supply, and smoothing apparatus for smoothing pulses of fluid within the second fluid supply and integral with the second fluid supply.

In accordance with a another aspect of the present invention, the second fluid supply and smoothing apparatus comprise an elastomeric hose having a durometer value less than or substantially equal to 60.

In accordance with a further aspect of the present invention, the second fluid supply and smoothing apparatus comprise a first conduit in fluid communication with the valve, a bladder in fluid communication with the first conduit, and a second conduit in fluid communication with the bladder and the engine exhaust system.

In accordance with yet another aspect of the present invention, the first fluid supply comprises a first conduit in fluid communication with the fluid inlet, a bladder in fluid communication with the first conduit, and a second conduit in fluid communication with the bladder and the valve.

In accordance with a further aspect of the present invention, the first fluid supply comprises a first conduit in fluid communication with the fluid inlet, a second conduit in fluid communication with the valve, and a through-filter connecting the first conduit and the second conduit. The through-filter comprises a hollow body, an inlet at a first end of the hollow body and in fluid communication with the first conduit, an outlet at a second end of the hollow body and in fluid communication with a secondary conduit, a radial outlet located along the hollow body and in fluid communication with the second conduit, and filter means at the radial outlet.

In accordance with still another aspect of the present invention, an exhaust gas temperature control system is provided for use with a two-stroke engine having an engine exhaust system, wherein the control system comprises a fluid inlet for providing fluid to control exhaust gas temperature within the engine exhaust system, a first fluid supply in fluid communication with the fluid inlet, a second fluid supply in fluid communication with the engine exhaust system, a valve connecting the first fluid supply and the second fluid supply, and fluid-capturing apparatus for capturing fluid in order to maintain pressure of fluid supplied to the valve, the fluid capturing apparatus being integral with the first fluid supply. In a further embodiment of such an exhaust gas temperature control system, the first fluid supply and fluid capturing apparatus comprise a first conduit in fluid communication with the fluid inlet, a bladder in fluid communication with the first conduit, and a second conduit in fluid communication with the bladder and the valve. In an alternative embodiment of such an exhaust gas temperature control system, the second fluid supply comprises an elastomeric hose having a durometer value less than or substantially equal to 60.

In accordance with the present invention, a method of controlling exhaust gas temperature from a two-stroke engine having the exhaust apparatus comprises supplying a fluid to a valve via a first fluid supply, supplying an amount of fluid to smoothing apparatus by opening and closing the valve, the amount of fluid supplied being determined by operation of the two-stroke engine, smoothing the amount of fluid supplied with the smoothing apparatus, and transferring the supply of fluid to the exhaust apparatus to thereby control exhaust gas temperature within the exhaust apparatus. In a further embodiment of such a method, the method further comprises capturing fluid within the first fluid supply and releasing fluid that is captured based on operation of the two-stroke engine.

Other features and advantages of the present invention will be understood upon reading and understanding the detailed description of the preferred exemplary embodiments, found hereinbelow, in conjunction with reference to the drawings, in which like numerals represent like elements.

DETAILED DESCRIPTION OF THE PREFERRED EXEMPLARY EMBODIMENTS

Figure 1:
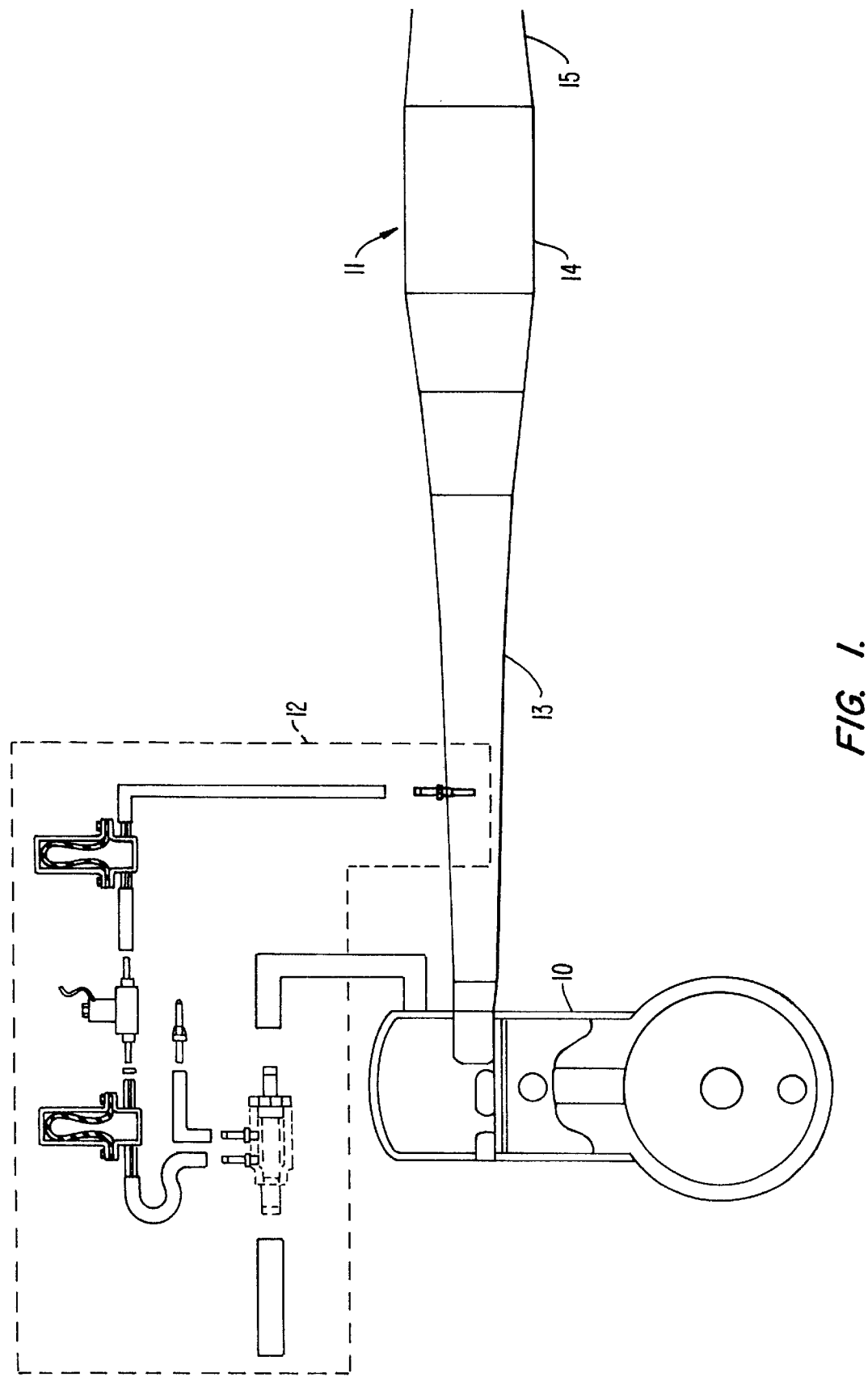
FIG. 1 is a side elevation view of an engine exhaust system with a schematic portion illustrating apparatus for improving control of exhaust gas temperature in accordance with the present invention.
Figure 2A:
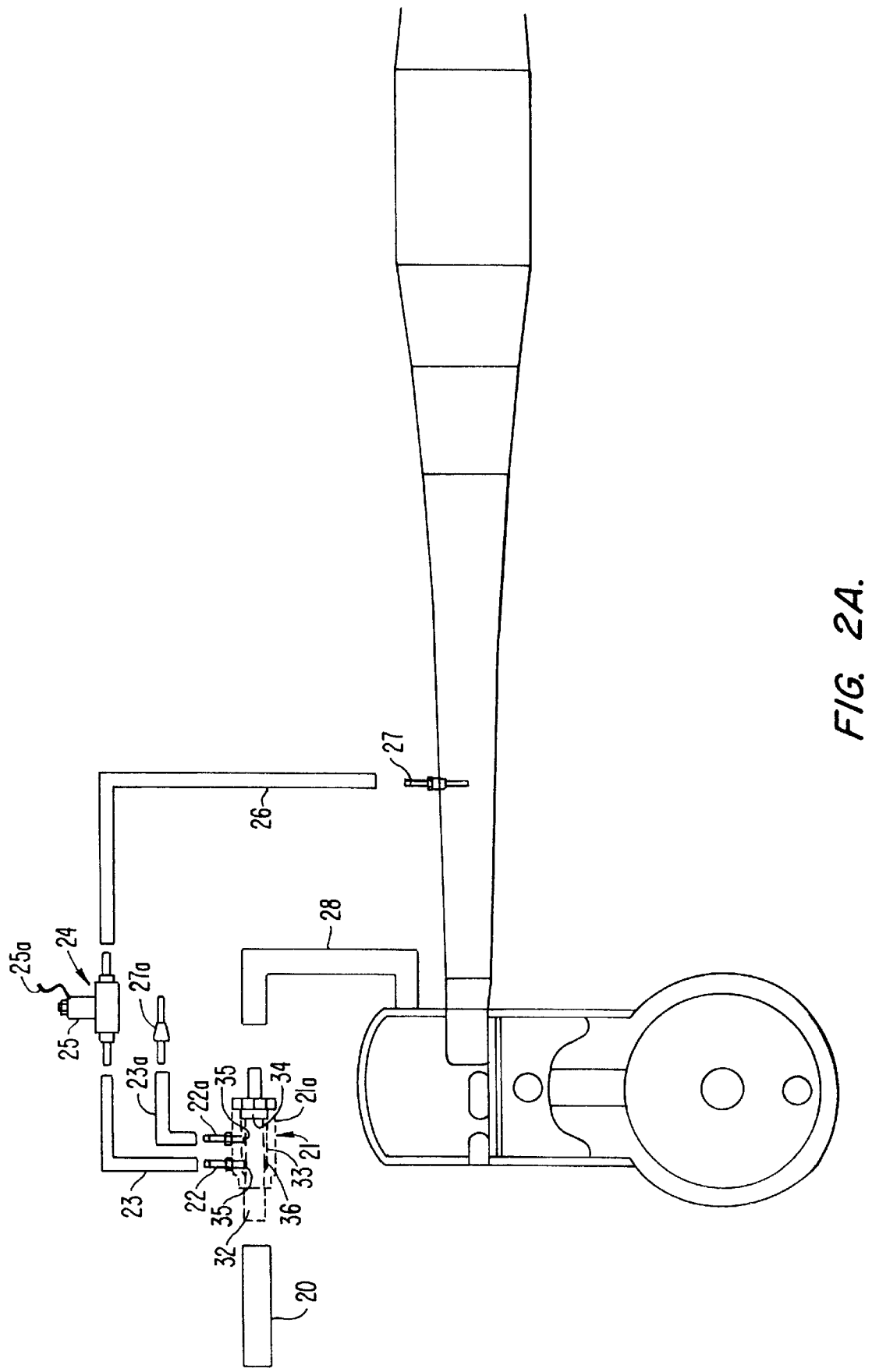
FIG. 2A is an enlarged schematic of apparatus for improved control of exhaust gas temperature in accordance with the present invention.
Figure 2B:
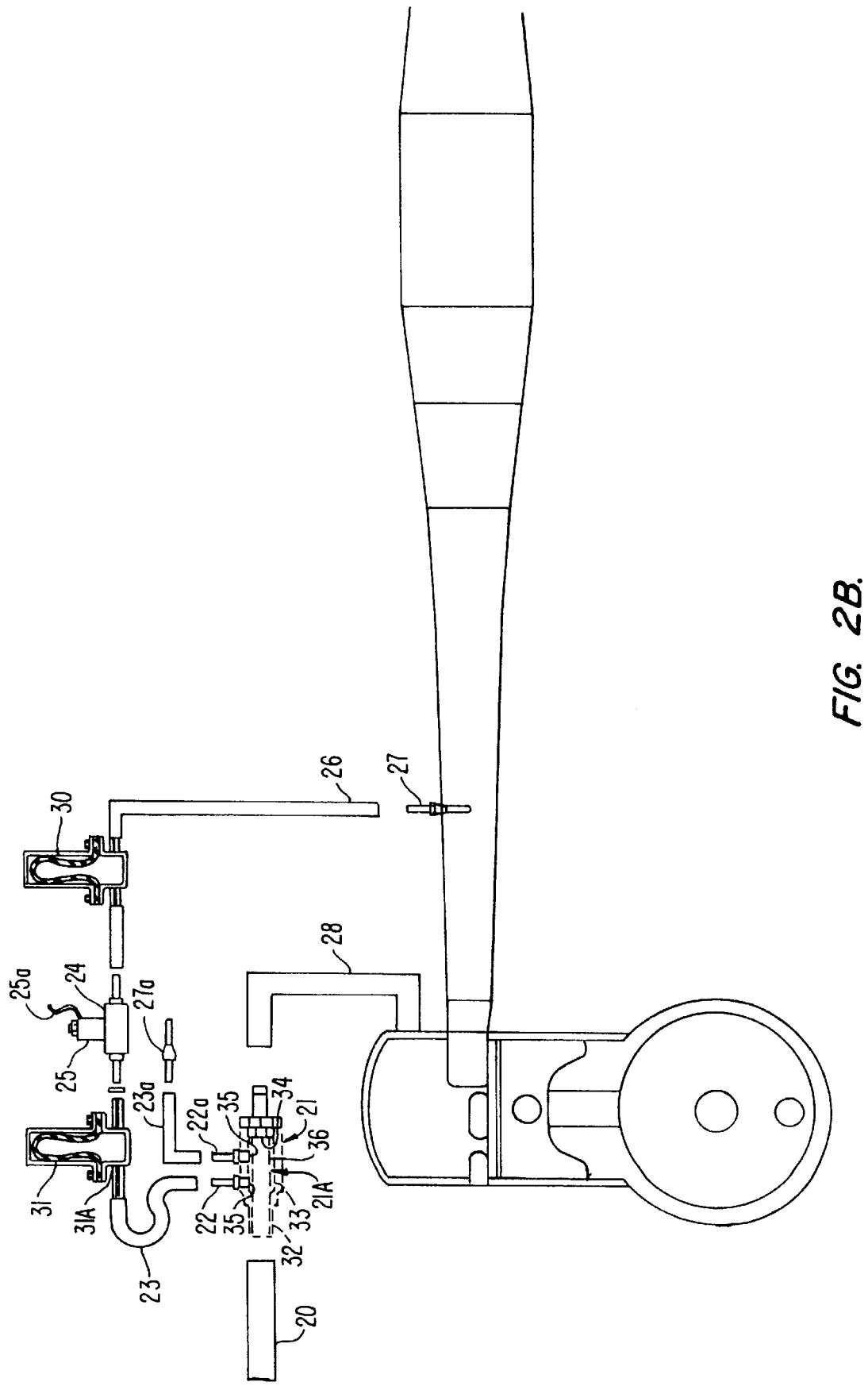
FIG. 2B is an enlarged schematic of an alternative embodiment of apparatus for improved control of exhaust gas temperature in accordance with the present invention.

Turning to FIGS. 1, 2A and 2B, a portion of a two-stroke engine 10 is illustrated. Connected to engine 10 is an exhaust pipe 11. Also shown is an electronically controlled water injection system (ECWI) 12.

Engine 10 is a standard two-stroke engine, or two-cycle engine, as they are also sometimes referred to, commonly found in motorcycles, personal watercraft, snowmobiles, and the like. Exhaust pipe 11 has a standard design that includes an expanding and diverging section 13, an intermediate section 14, and a converging section 15. ECWI system 12 is utilized to control the exhaust gas temperature, and hence the sonic wave speed, produced by the engine within the exhaust pipe as was previously described.

ECWI system 12 includes a supply conduit 20 that is connected to a water source, i.e. a pump, a nozzle, etc., (not shown) that supplies water to ECWI system 12. Of course, any other substance suitable for cooling may be used. Supply conduit 20 is connected to a splitting junction 21 that includes a through-filter 21a. A connector nozzle 22 connects an intermediate conduit 23 to the splitting junction. An optional secondary conduit 23a may also be connected to the splitting junction with a connector nozzle 22a. Secondary conduit 23a is connected to an optional full time spray nozzle 27a that may be used to provide full time water spray to exhaust pipe 11, if so desired. Intermediate conduit 23 is connected to solenoid valve 24. Appropriate electrical means 25, which are well known in the art, are provided for controlling solenoid valve 24. These electrical means are connected to an electrical system (not shown) of engine 10 via wires or the like 25a. A spray conduit is connected to solenoid valve 24 at an end opposite the intermediate conduit and is also connected to a spray nozzle 27 that is connected to exhaust pipe 11. A cooling conduit 28 is also connected to splitting junction 21 and is connected to engine 10.

Along the spraying conduit 26, and integral therewith, is provided a smoothing device 30. Smoothing device 30 is preferably in the form of an elastomer hose made of low durometer material, preferably substantially equal to or below sixty durometer, so that such a section of spraying conduit 26 would act in a manner similar to a pressurized bladder. Generally, silicon hose is preferred. Such a hose has improved heat characteristics as an additional benefit.

Preferably, all of conduit 26 would comprise hose having a durometer value substantially equal to or below sixty. Alternatively, smoothing device 30 could be in the form of a pressurized bladder, preferably about 4 ounces in size. Such an alternative embodiment is illustrated in FIG. 2B. Other examples of smoothing devices include, but are not limited to, a soft diaphragm, a diaphragm utilizing a spring or air, a spring-actuated piston for discharging water from a cylinder, and a "stand pipe" or other method for capturing air or some other compressible medium in the water line.

Accordingly, during operation, water is supplied through supply conduit 20 to splitting junction 21. Water is filtered with through-filter 21a and is provided to intermediate conduit 23. Unfiltered water is provided to cooling conduit 28, which is supplied to the engine for cooling purposes. The water that is to be filtered passes radially through filter 21a while unfiltered water passes axially straight through splitting junction 21. This unfiltered water that travels straight through carries away any debris from the filter, thus reducing filter maintenance.

Through-filter 21a preferably comprises an inlet 32, a hollow body 33, and a through-outlet 34. Through-filter 21a also includes at least one radial outlet 35 for connection to connector nozzle 22. More radial outlets 35 may be provided if it so desired, such as in an embodiment where a full time spray nozzle is desired. Within hollow body 33 is some type of filtering structure 36 lining hollow body 33. Preferably, filter structure 36 fully lines or surrounds the interior of hollow body 33. However, the filter structure 36 is only required to filter fluid provided to any radial outlets 35 that are included with through-filter 21a. Preferably, inlet 32 and filter structure 36 have the same diameter. Outlet 34 may have the same diameter as inlet 32 and filter structure 36. Alternatively, it may have a smaller or "stepped" diameter with respect to filter structure 36. While downstream resistance of the fluid due to passage through engine waterjacket is significant, the stepped diameter embodiment may help ensure adequate fluid pressure at all outlets 34 and 35. Obviously, the inner portion of body 33 and inlet 32 may have the same diameter and therefore filter structure 36 would be placed within radial outlets 35. Filter structure 36 is made of appropriate water permeable material and in the preferred embodiment is a metal screen. Other suitable materials include nylon, plastic and the like.

Thus, water enters inlet 32, flows into the inner portion of body 33 and encounters the reduced diameter or "step" of outlet 34. Therefore, some water passes through outlet 34 and some water passes through radial outlet 35. The water that passes through radial outlet 35 is filtered by filter structure 36. Debris that is filtered or trapped by filter structure 36 is continually removed and carried away by the water flowing through outlet 34 and, thus, filter structure 36 is kept clean and should never require servicing. Accordingly, through-filter 21a serves as a splitting junction that is capable of supplying unfiltered water to sources that do not require filtered water or fluid while also supplying filtered water or fluid to sources that do require filtered water.

Water travels through intermediate conduit 23 and reaches solenoid valve 24, which, during operation of engine 10, is opened and closed at a high speed (at about 10 milliseconds frequency). The water exiting solenoid valve 24 enters spraying conduit 26, passes through smoothing device 30, and exits spraying conduit 26 via spray nozzle 27 into exhaust pipe 11. This allows control of the exhaust gas temperature (and hence the sonic wave speed) within the exhaust pipe 11. The water exiting solenoid valve 24 exits in such bursts or pulses that, if these bursts or pulses were supplied to the exhaust pipe, the exhaust gas temperature, and hence the sonic wave speed, would change so quickly that in the time span of one pulse cycle the exhaust gas temperature would go from too high (sonic wave speed too fast) to too low (sonic wave speed too slow) and back again. However, smoothing device 30, due to the bladder or expansion capabilities of the elastomeric section of spraying conduit 26, smooths or dissipates the pulses or bursts of water, thereby allowing for better control of the exhaust gas temperature and helping maintain the exhaust gas temperature closer to ideal, which results in more horsepower during engine operation.

Accordingly, it can readily be seen that somewhere along spraying conduit 26, an elastomeric or bladder-like smoothing device 30 in the form of a variable volume body will provide a smoother or more even flow of fluid. Preferably, a soft, short hose of durometer 60 or less is utilized such that the soft, short section of hose is similar to a bladder. As the hardness of the hose utilized increases, the effective volume of the section of hose will decrease and therefore a longer section of hose will be needed for conduit 26. Accordingly, hoses having durometer levels higher than 60 can be utilized if the length utilized is increased accordingly. Therefore, another embodiment of smoothing device 30 includes a long, coiled section of hose that has a durometer value greater than 60 along conduit 26.

Therefore, device 30 is a variable volume body. The device 30 will be designed based on hardness of the hose, diameter, and length to create a smoothing device 30 having sufficient volume for fluid to appropriately "smooth" the fluid pulses within conduit 26. Device 30 will capture pressure "peaks" of water (high) and release these peaks of water at times when the pressure in conduit 26 is low (valleys). Device 30 will need to be of the right size/durometer to smooth high frequency pulses greater than 10 Hz while not affecting low frequency less than 1.0 Hz pressure changes. If device 30 is too large, it will capture water when the engine rpm is rising and release this water into the exhaust system when the engine has reached top rpm. This is not desirable. If device 30 is too small/hard, it will not capture enough water at the high pressure points to sufficiently fill the low pressure "valleys". A right size/durometer device 30 will capture water at the high pressure points and release at the low pressure points without storing water for long enough amounts of time such that water is released into the exhaust system when the engine rpm has risen. In summary, device 30 needs to capture/release water in a time frame that will smooth short-term ups and downs that occur as a result of solenoid valve 24's pulse width modulation without affecting the long-term (greater than 0.5 seconds) decreased water pressure caused by turning the solenoid valve off altogether.

Figure 3:
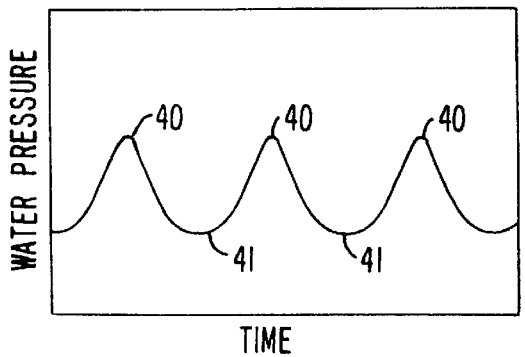
FIG. 3 is a graph illustrating the relationship of water pressure versus time as it exits a solenoid valve that is part of the apparatus for improved control of exhaust gas temperature in accordance with the present invention.
Figure 4:
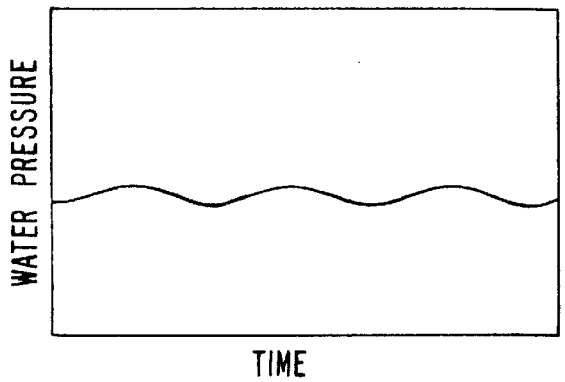
FIG. 4 is a graph illustrating the relationship of water pressure versus time at the point of injection in accordance with the present invention, the point of injection being located at an engine exhaust pipe.
Figure 5:
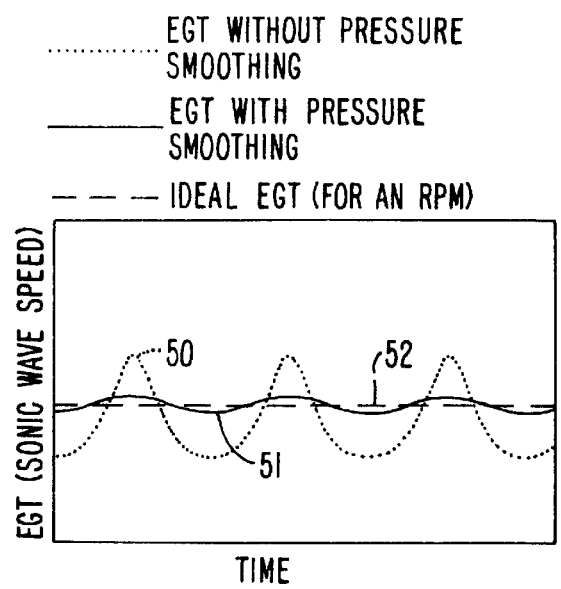
FIG. 5 is a graph illustrating the relationship of exhaust gas temperature (sonic wave speed) versus time within the exhaust pipe of a two-stroke engine when utilizing apparatus for improved control of exhaust gas temperature in accordance with the present invention.

FIGS. 3–5 illustrate results of preliminary testing of an electronically controlled water injection system 12 in accordance with the present invention. FIG. 3 illustrates the erratic relationship of water pressure over time as it exits solenoid valve 24, with "peaks" 40 and "valleys" 45. FIG. 4 illustrates the "smoothed over" water pressure versus time after passing through the smoothing device 30. Finally, FIG. 5 illustrates the improved exhaust gas temperature (sonic wave speed) versus time that is achieved with an electronically controlled water injection system 12 in accordance with the present invention. Dotted line 50 illustrates the exhaust gas temperature without smoothing, solid line 51 illustrates the exhaust gas temperature after smoothing, and broken line 52 illustrates ideal exhaust gas temperature for an rpm.

In accordance with an alternative but preferred embodiment of electronically controlled water injection system 12, a capturing device 31 is provided along intermediate conduit 23. In the preferred embodiment, capturing device 31 comprises a pressurized bladder preferably having a check valve at a distal end 31a of capturing device 31. Capturing device 31 allows for capture of water within the device so that a more constant amount of water under appropriate pressure is provided to solenoid valve 24, and thereby spray nozzle 27 and into exhaust pipe 11. This is desirable in that available water pressure is generally directly linked to engine rpm. At lower engine speeds, lower exhaust gas temperature (and hence lower sonic wave speeds) are desired in the exhaust system for optimum engine performance and greater horsepower. However, since the water pressure is directly linked to engine rpm, generally, the water pressure may not be sufficient at low engine speeds to appropriately cool the exhaust. Therefore, since low engine speeds require a high amount of water pressure injected into the exhaust system, but low engine speeds produce only a low amount of available water pressure, capturing device 31 allows for an "auxiliary" supply of water to be maintained within intermediate conduit 23 to therefore ensure that appropriate water pressure is available regardless of engine rpm.

Accordingly, during operation of engine 10, water is supplied by supply conduit 20 to solenoid valve 24 via splitting junction 21 and intermediate conduit 23. During high engine operation (high rpms), ample water pressure is supplied to the solenoid device and is captured within capturing device 31. Water not released by solenoid valve 24 is maintained within capturing device 31 due to the presence of check valve 31a. During low engine operation (low engine rpms), ample water pressure is still provided to the solenoid valve due to release of water within capturing device 31. Accordingly, high water pressure is available to be used at low engine speeds when high water pressure that is required would otherwise not be available.

Although the invention has been described with reference to specific exemplary embodiments, it will be appreciated that it is intended to cover all modifications and equivalents within the scope of the appended claims.

What is claimed is:

1. An exhaust gas temperature control system for use with a two-stroke engine having engine exhaust means, the system comprising:

a fluid inlet for providing fluid to control exhaust gas temperature within the engine exhaust means;

a first fluid supply means in fluid communication with the fluid inlet;

a second fluid supply means in fluid communication with the engine exhaust means;

a valve connecting the first fluid supply means and the second fluid supply means; and variable volume smoothing means for smoothing pulses of fluid within the second fluid supply means, the smoothing means being integral with the second fluid supply means.

2. The exhaust gas temperature control system of claim 1 wherein the second fluid supply means and smoothing means comprise an elastomeric hose having a durometer value less than or equal to sixty.

3. The exhaust gas temperature control system of claim 1 wherein the second fluid supply means and smoothing means comprise:

a first conduit in fluid communication with the valve;

a bladder in fluid communication with the first conduit; and a second conduit in fluid communication with the bladder and the engine exhaust means.

4. The exhaust gas temperature control system of claim 1 wherein the first fluid supply means comprise:

a first conduit in fluid communication with the fluid inlet;

a second conduit in fluid communication with the valve; and a through-filter connecting the first conduit and the second conduit, the through-filter comprising:

a hollow body;

an inlet at a first end of the hollow body and in fluid communication with the first conduit;

an outlet at a second end of the hollow body and in fluid communication with a secondary conduit;

a radial outlet located along the hollow body and in fluid communication with the second conduit; and filter means at the radial outlet.

5. A method of controlling exhaust gas temperature from a two-stroke engine having exhaust means, the method comprising:

supplying a fluid to a valve via a first fluid supply means;

supplying an amount of fluid to variable volume smoothing means by opening and closing the valve, the amount of fluid supplied being determined by operation of the two-stroke engine;

smoothing water pressure of the supply of fluid with the smoothing means; and transferring the supply of fluid to the exhaust means to thereby control exhaust gas temperature within the exhaust means.

* * * * *